US 12,517,086 B2

(12) United States Patent
Sohrabi et al.

(10) Patent No.: US 12,517,086 B2
(45) Date of Patent: Jan. 6, 2026

(54) PORTABLE DEVICE AND SYSTEM FOR RAPID DETECTION OF A BACTERIAL CELL IN FLUID SAMPLES

(71) Applicant: ROSHAN WATER SOLUTIONS INCORPORATED, Edmonton (CA)

(72) Inventors: Amirreza Sohrabi, Edmonton (CA); Parmiss Mojir Shaibani, Edmonton (CA)

(73) Assignee: Roshan Water Solutions Incorporated (CA)

( * ) Notice: Subject to any disclaimer, the term of this patent is extended or adjusted under 35 U.S.C. 154(b) by 1059 days.

(21) Appl. No.: 17/453,529

(22) Filed: Nov. 4, 2021

(65) Prior Publication Data

US 2022/0057359 A1    Feb. 24, 2022

Related U.S. Application Data

(63) Continuation of application No. PCT/CA2020/050593, filed on May 4, 2020.

(60) Provisional application No. 62/844,406, filed on May 7, 2019.

(51) Int. Cl.
*G01N 27/416* (2006.01)
*G01N 27/30* (2006.01)
*G01N 27/327* (2006.01)

(52) U.S. Cl.
CPC ....... *G01N 27/4167* (2013.01); *G01N 27/302* (2013.01); *G01N 27/327* (2013.01)

(58) Field of Classification Search
CPC ............. G01N 27/4167; G01N 27/302; G01N 27/305; B01L 3/502; B01L 2200/028; B01L 2200/0631; B01L 2300/0829; B01L 2300/0887

See application file for complete search history.

(56) References Cited

U.S. PATENT DOCUMENTS

2017/0342459 A1*  11/2017  Knopfmacher .......... C12Q 1/04

OTHER PUBLICATIONS

Shaibani et al., (Sensors and Actuators B: Chemical. vol. 226, Apr. 2016, pp. 176-183). (Year: 2016).*
Dantism et al., ( Procedia Engineering 120 (2015) 384-387) (Year: 2015).*

(Continued)

*Primary Examiner* — Jana A Hines
(74) *Attorney, Agent, or Firm* — Haynes & Boone, LLP

(57) ABSTRACT

A system for rapid analysis of a fluid sample for detection of at least one viable microbial organism therein. The system comprises a cartridge that is demountably engageable with a reader component. The cartridge has a first well receiving a fluid sample, with a second well and third well imbedded under portions of the first well. The second well has a sensor configured to send a reference signal to the reader component, while the third well has a sensor configured to send a sample signal to the reader component. When in use, the cartridge is engaged with the reader component and a fluid sample is placed into the first well. The reader component controllably illuminates the third well and comprises a detector that detects differences in photocurrent and/or spectra between the reference signal and the sample signal from the illuminated third well.

5 Claims, 5 Drawing Sheets

(56) References Cited

OTHER PUBLICATIONS

International Search Report and Written Opinion dated Jun. 26, 2020 issued in related PCT application No. PCT/CA2020/050593 (10 pages).
Shaibani et al., "Portable Nanofiber-Light Addressable Potentiometric Sensor for Rapid *Escherichia coil* Detection in Orange Juice". ACS Sensors, Mar. 13, 2018 (Mar. 13, 2018), vol. 2018 3 (4), pp. 815-822, [online] [retrieved on Jun. 9, 2020 (Sep. 6, 2020)]. Retrieved from the Internet: <DOI: 10.1021/acssensors.8b00063>.
Dantism, S. et al. Light-addressable potentiometric sensor (LAPS) combined with multi-chamber structures to investigate the metabolic activity of cells, Procedia Engineering 120 (2015) 384-387.
European Extended Search Report, EP20802464.6 dated Dec. 23, 2022.
Shaibani, P.M. et al., The detection of *Escherichia coli* (*E. coli*) with the pH sensitive hydrogel nano-fiber-light addressable potentiometric sensor (NF-LAPS), Sensors and Actuators, 2016, 176-183, B 226.
Shaibani, P.M. et al., Metabolic Study of Cancer Cells Using a pH Sensitive Hydrogel Nanofiber Light Addressable Potentiometric Sensor, ACS Sens, 2017, 151-156, 2.
Shaibani, P.A., Pathogen detection with the Nanofiber-Light Addressable Potentiometric Sensor (NF-LAPS), Ph.D. Thesis, Feb. 2017.
Shabani, P.A. (2017) Pathogen detection with the Nanofiber-Light Addressable Potentiometric Sensor (NF-LAPS), Ph.D. Thesis, Feb. 2017.

\* cited by examiner

Fig. 3A
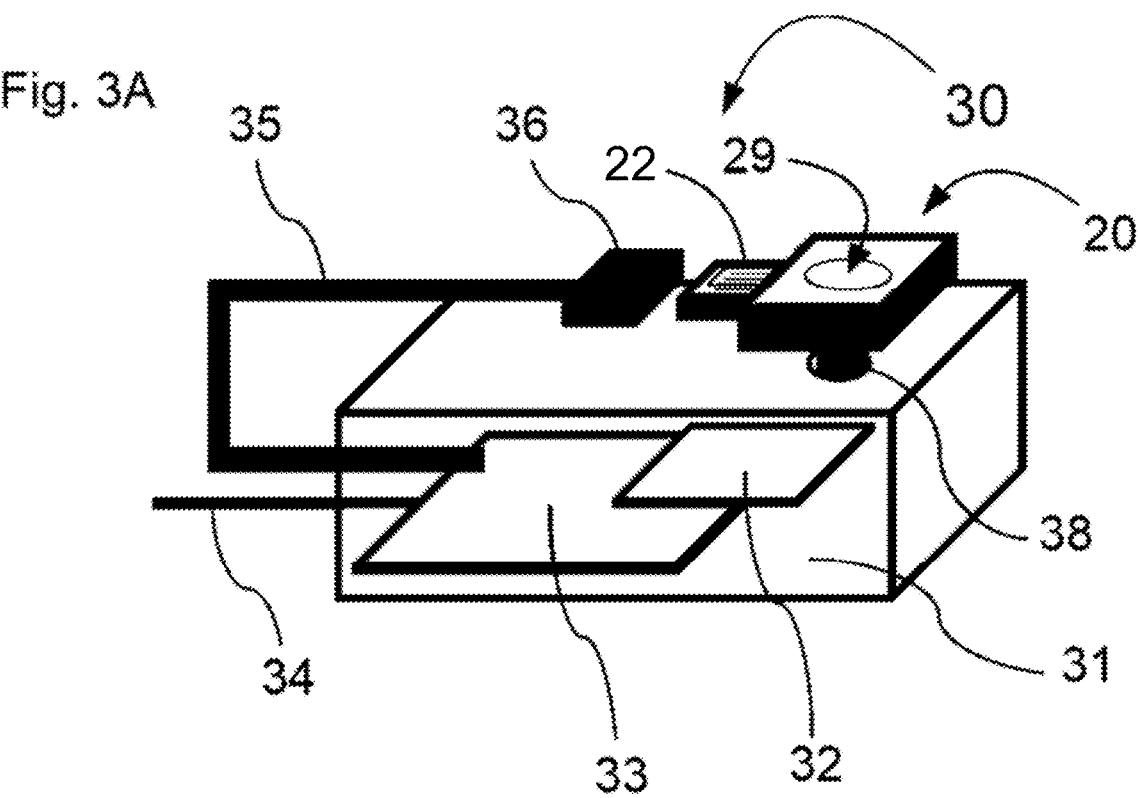
Fig. 3B
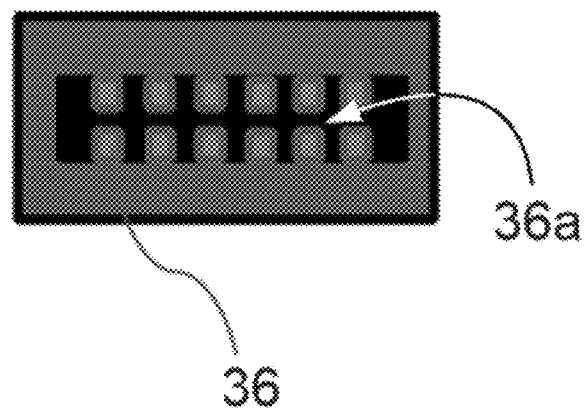
Fig. 3

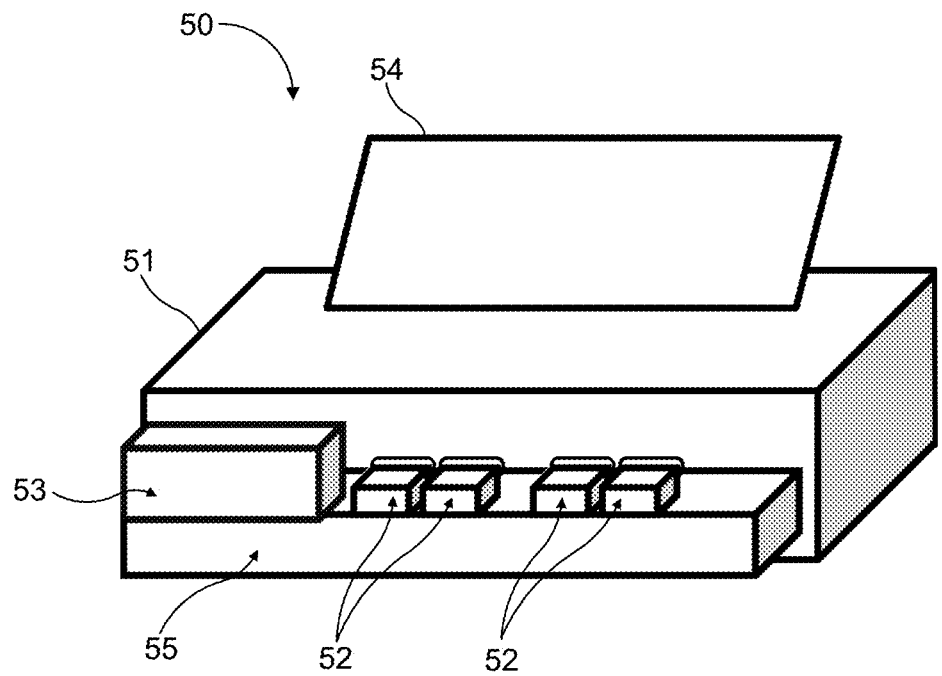
Fig. 4A
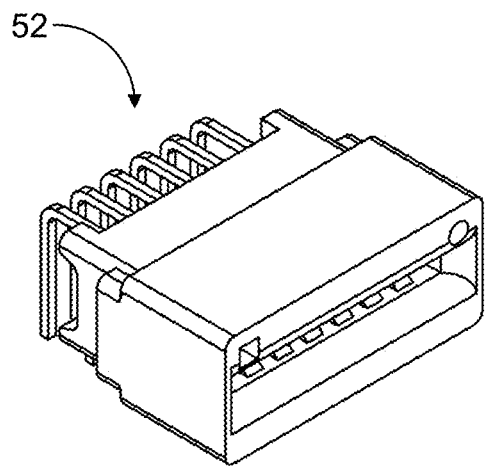
Fig. 4B
Fig. 4

PORTABLE DEVICE AND SYSTEM FOR RAPID DETECTION OF A BACTERIAL CELL IN FLUID SAMPLES

CROSS-REFERENCES TO RELATED APPLICATIONS

This application is a continuation of International Application No. PCT/CA2020/050593, filed on May 4, 2020 which claims priority to U.S. Provisional Application No. 62/844,406 filed May 7, 2019, which is incorporated herein by reference in its entirety.

FIELD

The present disclosure generally relates to testing fluid samples for detection of harmful bacteria. More specifically, this disclosure pertains to portable devices and systems configured for highly sensitive and rapid detection of harmful bacteria in fluid samples.

BACKGROUND

Potable water is commonly defined as water that is safe for human consumption by drinking or in prepared food. Developed countries have specified water quality standards for potable water with criteria that generally fall into three categories with upper limits set for (i) physical properties, (ii) chemical composition, and (iii) the presence of microorganisms. Physical and chemical parameters commonly specified and measured include heavy metals, trace organic compounds, total suspended solids, and turbidity. Potable water supplies are regularly and routinely assessed for the presence of and numbers of coliform bacteria, certain pathogenic bacteria such as cholera-causing Vibrio cholera, viruses, and protozoan parasites.

The current methods and standards commonly used for testing water samples for the presence of coliform bacteria rely on access to and proximity to well-equipped certified laboratories. In a typical water testing process, water samples are collected from a testing area, for example from a potable-water treatment facility or a potable-water distribution system. The water samples are then placed into water-sample containers that contain preservatives to preserve the samples' biological, chemical, and physical properties during shipment to a testing laboratory. Subsequently, the water samples are shipped to the testing lab using conveyance options that ensure delivery within 24 hours of sampling. The water-testing procedures typically require twelve to eighteen hours to generate water quality results. This scheme represents 1-2 days of delay between sampling and generation of the final results in larger communities that are nearby laboratory facilities. It is well known, however, that the average waiting time for water quality testing results for many smaller municipalities often ranges between three to five days. These delays represent significant challenges if any of the water samples from these smaller communities are contaminated by harmful bacteria. The main problems faced by smaller communities in regard to providing safe potable water include (i) long delays between the times that water samples are collected at sources, then transported to, received, analyzed by testing laboratories, and the resulting water quality reports provided to the communities, and (ii) the need for frequent resampling and retesting due to changes in one or more of the water samples' biological, chemical, and physical properties.

The Canadian Drinking Water Quality Guidelines for total coliforms and for *Escherichia coli* (*E. coli*) stipulate that none of either should be detectable per 100 mL of drinking water. Three methods are commonly used in Canadian laboratories for routine monitoring of potable water supplies to detect the presence of any coliforms and/or *E. coli*: (i) the presence-absence (P-A) method, (iii) the membrane filter (MF) method, and (iii) the multiple tube fermentation procedure. The problem with each of these methods is that at least one to two days are required to provide conclusive evidence of the presence or the absence of coliforms and/or *E. coli* in the collected water samples. In the meantime, potentially compromised sources of potable water must be avoided if possible or alternatively, boiled prior to use.

Another commonly used approach is the Most Probable Number (MPN) method to provide assurance that a drinking water supply is safe or not for human use. The MPN test has three steps. The first step is a presumptive test wherein replicates of three logarithmic dilutions (10 mL; 1 mL; 0.1 mL) of a water sample are incubated in suitable culture media at 37° C. for 24 hr. If no microbial growth occurs in any of the tubes for all three dilution series, the source of the water samples is considered safe for drinking. However, if some of the tubes show evidence of microbial growth (i.e., a "positive result"), then a second test is performed to confirm the presence of coliforms and/or *E. coli* in the water source (i.e., the confirmatory test). Samples of the microbial cultures are taken from the "positive" tubes from the presumptive test, to inoculate: (i) a lactose-broth fermentation tube, (ii) an agar slant, and (iii) tryptone water tube, all of which are incubated for 24-48 hrs. If any of the lactose-broth fermentation tubes show evidence of gas formation and/or the tryptone water tubes show evidence of indole production, then the third test (i.e., the "completed test") is performed by streaking a sample from each of the "positive" tubes onto EMB or Endo agar and then incubated for at another 24 hr at 37° C. and at 44° C., and then examined to determine if the arising cultures are coliforms and/or high-temperature tolerant *E. coli*. The advantages of the MPN test over the three Drinking Water Quality Guideline tests include ease of use and interpretation of results. However, the MPN testing requires a minimum of two to five days to confirm the presence of coliforms and/or *E. coli*. Furthermore, the MPN results are not very accurate and it is known that the MPN test can produce false positives.

Public concerns over potable water quality supplies has led to the development and use of rapid "presumptive" testing methods and devices that are purported to produce results within minutes or within a few hours of collecting a water sample. A recent example of a potentially useful water-testing device (FIG. 1) based on light-addressable potentiometric sensors (LAPS) was disclosed by Shaibani et al., 2016. LAPS technologies are based on combining semi-conductor science with electrochemistry for detection of changes caused by the presence of microorganisms in a variety of substrates (Owicki et al., 1994; Yoshinobu et al., 2003). In general terms, a measurement site on the sensing surface of a semiconductor-based chemical sensor is defined by illumination. This light addressability can be applied to visualize the spatial distribution of pH or the concentration of a specific chemical species. Basic research with LAPS devices and systems suggest that high spatial resolutions in submicron ranges and readout speeds in the range of tens of thousands pixels per second are possible. However, very few LAPS-based devices have been successfully configured and adapted to routine use for assessing biological samples. For example, the lowest sensitivities achieved with the Shaibani LAPS sensor for detection of *E. coli* in a water sample was a theoretical limit of detection (LOD) of 20 CFU/mL (Shaibani of al, 2016) and also, a theoretical limit of detection of 20 CFU/mL in undiluted orange juice (Shaibani et al., 2018).

SUMMARY

The embodiments of present disclosure generally relate to apparatus, systems, and methods for use thereof to detect at least one target viable bacterial cell in a 100-mL fluid sample. The apparatus and methods are configured to provide a positive result or a negative result within 1 h of commencing the method using the apparatus.

In an example of an embodiment according to the present disclosure, a system for rapid analysis of a fluid sample for detection of at least one viable microbial organism therein comprises: a reader component comprising a housing containing therein an illumination supply in communication with a port extending to a selected target site on the outer casing, circuitry for controlling the illumination supply, a potentiostat; circuitry interconnecting the potentiostat with one or more receptacles; a detector configured for detecting one or more differences in photocurrent between a reference source and a sample source; wherein said reader component is configured for electronic communication with a microprocessor for modulation of the circuitry for controlling the illumination supply and for modulation of the potentiostat; and at least one cartridge comprising a casing with an outward-facing tab configured for demountable engagement with the receptacle, a first well extending downward from an upper surface of the casing, said first well configured for receiving a fluid sample therein, a second well imbedded in the casing underneath a first portion of the first well, said second well having a screen printed electrode housing therein a counter electrode having a terminal end exposed at the outward-facing tab and a reference electrode having a terminal end exposed at the outward-facing tab; a third well imbedded in the casing underneath a second portion of the first well, said third well having a light-addressable potentiometric sensor with an upper surface having a layer of functionalized pH-sensitive hydrogel nanofibers thereon, said light-addressable potentiometric sensor having a working electrode having a terminal end exposed at the outward-facing tab; wherein a bottom surface of the casing has a bore extending upward to about a bottom surface of the third well, said bore configured for communication with the port; and wherein the screen printed electrode is configured to communicate a reference signal to the detector and the light-addressable potentiometric sensor is configured to communicate a sample signal to the detector.

In an example of another embodiment of the present disclosure, a cartridge for use with the systems disclosed herein comprises: a casing with an outward-facing tab configured for demountable engagement with the receptacle, a first well extending downward from an upper surface of the casing, said first well configured for receiving a fluid sample therein, a second well imbedded in the casing underneath a first portion of the first well, said second well having a screen printed electrode housing therein a counter electrode having a terminal end exposed at the outward-facing tab and a reference electrode having a terminal end exposed at the outward-facing tab; a third well imbedded in the casing underneath a second portion of the first well, said third well having a light-addressable potentiometric sensor with an upper surface having a layer of functionalized pH-sensitive hydrogel nanofibers thereon, said light-addressable poten-tiometric sensor having a working electrode having a terminal end exposed at the outward-facing tab; wherein a bottom surface of the casing has a bore extending upward to about a bottom surface of the third well, said bore configured for communication with the port; and wherein the screen printed electrode is configured to communicate a reference signal to the detector and the light-addressable potentiometric sensor is configured to communicate a sample signal to the detector.

BRIEF DESCRIPTION OF THE DRAWINGS

The embodiments of the present disclosure will be described in reference to the following drawings, in which:

FIG. 3 shows a schematic view (FIG. 3A) of the NF-LAPS device 20 from FIG. 2, demountably engaged with a reader 30, while FIG. 3B shows the LED light source 39 for illuminating the NF-LAPS device 20;

FIG. 4 shows a schematic view of a reader component according to one embodiment of the present disclosure (FIG. 4A) and perspective view of a receptacle according to one embodiment of the present disclosure (FIG. 4B)

DETAILED DESCRIPTION

The embodiments of the present disclosure generally relate to rapid and reliable testing apparatus, systems, and methods for confirming the presence of or absence of coliform bacteria and/or *E. coli* from potable water sources, supplies, and distribution infrastructures. The testing apparatus, systems, and methods disclosed herein are configured to detect the presence of one coliform bacterium and/or one *E. coli* cell in a 100-mL fluid sample. The testing apparatus, systems, and methods disclosed herein are configured to provide a positive or negative result within about one hour of testing a 100-mL fluid sample.

One embodiment of the present disclosure pertains to a system comprising a portable "reader" component and disposable cartridges for demountable engagement with the reader component. According to one aspect, the system is portable. The system may be carried by hand. The reader component may be configured for engagement by and control with one hand. The reader component may be configured for ergonomic engagement by and operation with one hand. Alternatively, the reader component may be configured for placement onto a flat surface, for example onto the top of a bench or a shelf or a work surface.

Figure 1:
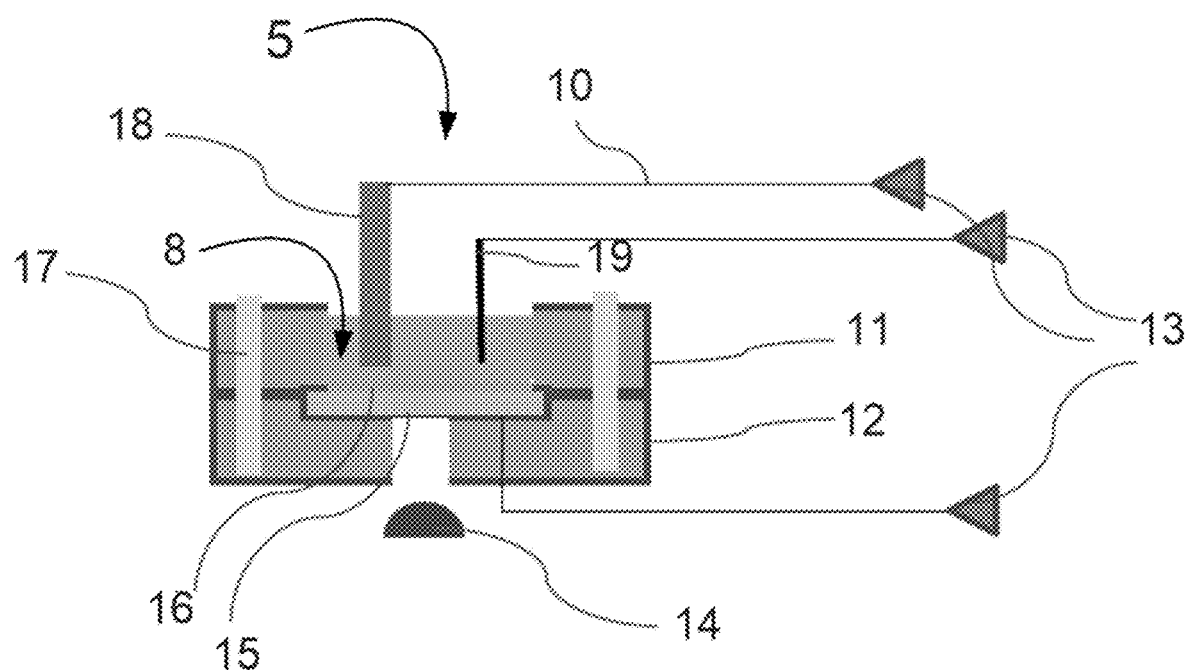
FIG. 1 is a side view of a prior art LAPS-based water testing device 5 disclosed by Shaibani et al., 2016, wherein the device 5 comprises a chip-holder upper body 11, a chip-holder bottom body 12, a plurality of alligator clips 13 for connection to a potentiostat (not shown), a light source LED 14, a silicon chip 15 with a nanofiberous layer 16 with unmodified thickness on the silicon chip 15, a set of screws 17 for engaging and disengaging the chip-holder upper body 11 with the chip-holder bottom body 12. A fluid sample 8 is placed into the assembled device 5 after which, a standard Ag/AgCl reference electrode 18 is inserted into the fluid. Platinum wires connect the silicon chip (acting as an electrode) and a counter electrode 19 inserted into the fluid 8, with the alligator clips 13.
Figure 2:
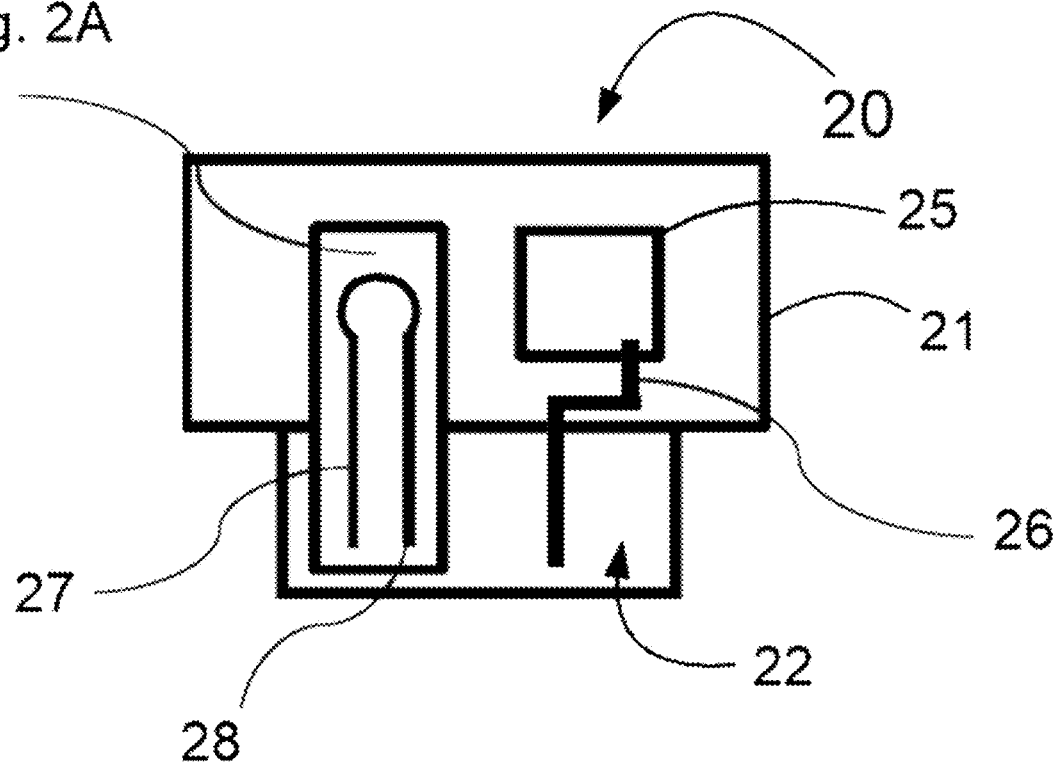
FIG. 2 shows a schematic side view (FIG. 2A) and a schematic top view (FIG. 2B) of one example of an embodiment of a nanofiber light-addressable potentiometric sensor (NF-LAPS) device 20 disclosed herein.
Figure 2:
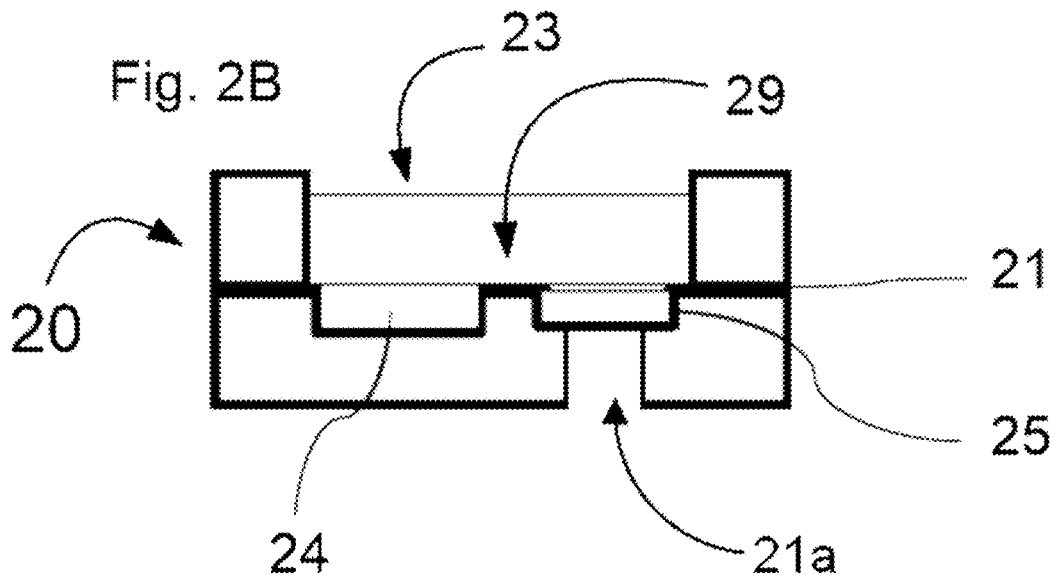

An example of a system disclosed herein is illustrated in FIGS. 2 and 3. The reader component 30 is illustrated in FIG. 3A and is provided with a casing 31 housing therein at least (i) a potentiostat circuit 33, (ii) a LED light source 38 and circuitry 32 to control the light source 38, and (iii) a receptacle 36, 36A for demountably engaging therein a terminal end of a disposable sampling cartridge 20 (also shown in FIGS. 2A, 2B) having an outward-extending tab 21 whereon are situated a working-electrode (WE) connecter 25, a counter-electrode (CE) connector 27, and a reference-electrode (RE) connecter 26. The receptacle 36, 36A (FIG. 3B) of the reader component 30 is provided with a WE connecter, CE connecter, and RE connecter configured for demountable engagement with the corresponding connectors on an outward-facing tab 21 of the disposable cartridge 20. A USB connection 34 is provided for engagement with a device having a microprocessor for communicating with and controlling the potentiostat circuit 33 and the light source 38 and circuitry. Further shown is the circuitry 35 interconnecting the potentiostat circuit 33 with one or more receptacles 36.

Another embodiment of the present disclosure pertains to disposable cartridges 20 (FIGS. 2A, 2B) configured for demountable engagement with the reader component 30 of the systems disclosed herein. Each of the disposable cartridges 20 generally comprises a casing 21 within which is contained: (i) a first well 23 on the upper surface of the cartridge 20 wherein the first well 23 is configured for receiving therein a fluid sample 29, (ii) a second well 24 situated underneath and physically separated from the first well 23, and (iii) a third well 25 also situated underneath the first well 23 and physically separated from the first and second wells (23, 24). The second well 24 houses therein a screen printed electrode (SPE) in communication with a counter electrode 27 and a reference electrode 28 with each of the electrodes 27, 28 terminating in a connector (i.e., a CE connector and a RE connector) in an outward-extending tab 22. The third well 25 houses therein a LAPS silicon chip having a layer of nanofibers deposited thereon, with the silicon chip in communication with a working electrode 26 terminating in a connector (WE connector) on the outward-extending tab 22. The outward-extending tab 22 of the disposable cartridge 20 is demountably engageable with the receptacle 36, 36a of the reader component 20. The bottom surface of the disposable cartridge 20 is provided with a port 21a extending upward toward, but not into, the third well 25.

Another example of a system according to the present disclosure is illustrated in FIG. 4A, wherein a reader component 50 is provided with a casing 51. The reader component 50 comprises a plurality of receptacles 52 (see FIG. 4B), each for demountably engaging therein a terminal end of a disposable sampling cartridge (e.g. cartridge 20). The plurality of receptacles 52 are accessible through a corresponding plurality of apertures in a face of the casing 51. As shown in the illustrated embodiment, the plurality of receptacles 52 may be evenly distributed across the face of the casing 51. Of course, the plurality of receptacles 52 may be distributed such that they may be accessible on two or more faces of the casing 52, and/or may be distributed in a pattern (e.g. pairs of receptacles 52 grouped together) rather than an even distribution. Further, the plurality of receptacles 52 may be configured in the same manner as described above (e.g. provided with a WE connecter, a CE connecter, and an RE connecter configured for demountable engagement with corresponding connectors on the terminal end of a disposable cartridge).

Further, as shown in FIG. 4, the casing 51 of the reader component 50 may be provided with a shelf portion 55 for supporting cartridges thereon when engaged with the plurality of receptacles 52. The shelf portion may be formed integrally with the casing 51 (i.e. as one part) or may be affixed to the casing by way of one or more fasteners such as screws, bolts, an adhesive, etc. Further, the shelf portion may house a plurality of LED light source therein for use in testing samples in the disposable cartridges. The number of LED light sources correspond to the number of receptacles 52.

The reader component 50 may also be provided with a one or more housings 53 for enclosing at least one cartridge that is engaged one of the plurality of receptacles 52. In the illustrated embodiment, the housing 53 is configured to enclose two cartridges. Further, in one aspect, the one or more housings 53 may be formed of an opaque material such as a plastic or a tinted and/or frosted glass.

Further, the reader component 50 may comprise a display 54 mounted thereon. The display 54 may be for communicating the operational status of the reader component 50, the status or results of a test run using the reader component 50, etc. According to an aspect, the display 54 may comprise a touch-screen (e.g. a capacitive touch screen). In such aspects, the display 54 may also be used to control the reader component 50. For example, the display 54 may be used to initiate testing of one or more samples, cease testing, initiate shut down of the reader component 50, etc. Further, the display 54 may be fixedly mounted to the casing 51 (e.g. in a straight or angled orientation) or may be hingedly mounted to the casing 51 such that the display 54 may be adjusted for different viewing angles and/or folded down onto the reader component to protect the screen and facilitate the transport of the reader component.

Figure 5:
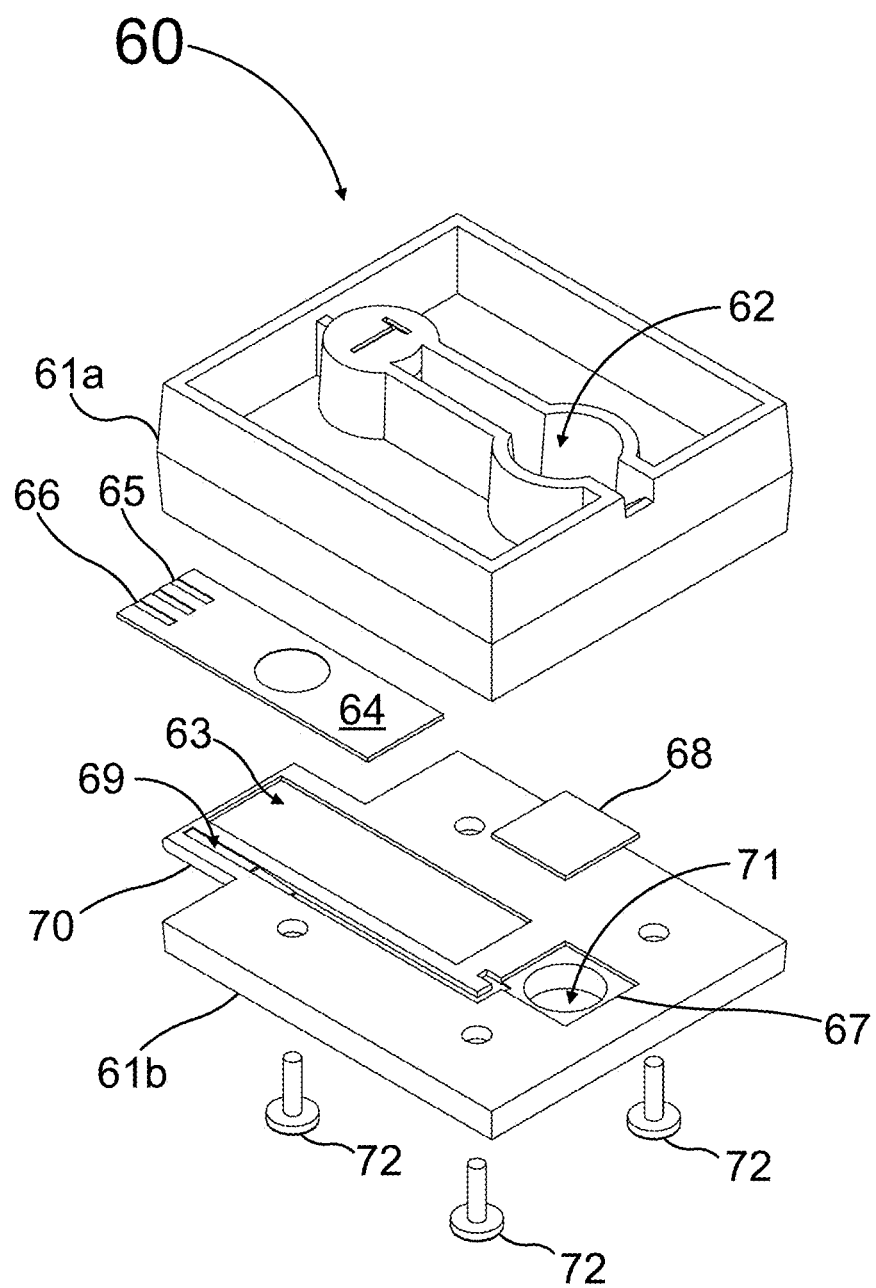
FIG. 5 is an exploded view of a disposable cartridge according to an embodiment of the present disclosure.

Another embodiment of the present disclosure relates to sample-holding disposable cartridges 60 (FIG. 5) configured for demountable engagement with the receptacles of reader components described herein (e.g. reader component 30 or 50). In this non-limiting example, the disposable cartridge 60 comprises an upper portion 61a and a lower portion 61b that may sealably joined via one or more fasteners such as screws, bolts, adhesives, and the like. In the illustrated embodiment, the upper portion 61a and lower portion 61b are joined using a plurality of screws 72. The upper portion 61a is provided with a first well 62 for receiving a sample therein. The lower portion 61b is provided with an outwardly-extending tab 70 and a second well 63 for receiving an SPE 64 therein, a portion of the second well 63 extending onto the outwardly-extending tab 70. The SPE 64 is in communication with a counter electrode 65 and a reference electrode 66, each of which terminates at a connector (i.e. a CE connector and a RE connector, respectively) on a portion of the SPE 64 located on the outwardly-extending tab 70. The lower portion 61b is also provided with a third well 67 for housing a LAPS silicon chip 68 therein. The silicon chip 68, when housed in the third well 67 is in communication with working electrode 69, which terminates at a connector (i.e. a WE connector) located on the outwardly-extending tab 70. The lower portion 61b also comprises a port 71, which extends into the third well 67 for the illumination thereof by an LED light source.

Another embodiment of the present disclosure pertains to methods for use of the system disclosed herein for testing potable water supplies for the presence or absence of coliform bacteria and/or *E.coli*. One example of the methods disclosed herein comprises the steps of collecting a 100-mL sample from a supply of potable water, inserting the outward-facing tab 22 of a disposable cartridge 20 according to the present disclosure, into the receptacle 36, 36a of the reader component 30 of the present disclosure, filling the first well 23 with a portion 29 of the 100-mL sample from a supply of potable water, turning on the light circuitry 32 of the reader component 30 thereby illuminating with a LED light source 38, the third well 25 of the disposable cartridge 20 through the port 21a provided therefore in the base of the cartridge 20 for a period of time from the range of about 15 min to about 60 minutes. Alternatively, the disposable cartridge 20 may be dipped into the water sample to fill the first well 23 after which, the outward-facing tab 22 of the disposable cartridge 20 is inserted into the receptacle 36, 36a of the reader component 30. As will be appreciated, a similar methods may be performed using the cartridge 60 illustrated in FIG. 5.

Another embodiment of the present disclosure relates to a silicon chip onto which a very thin layer of pH-sensitive hydrogel nanofibers is printed. A working electrode is laid down on the surface of the silicon chip prior to the printing thereon of the pH-sensitive hydrogel nanofibers. A suitable thickness for the hydrogel nanofiber layer is from a range of 7μ to 13μ. A particularly suitable thickness is 10μ. An example of a suitable pH-sensitive hydrogel nanofiber is poly acrylic acid/polyvinyl alcohol (PAA/PVA) hydrogel nanofibers. An advantage of using PAA/PVA pH-sensitive hydrogel nanofibers with illumination-generated LAPS signals is the intensity of the LAPS signals varies with the number of the charges on the surface (i.e. pH variation) as well as the physical swelling/de-swelling of the hydrogel layer. Swelling ratios for different pH values vary in pH sensitive hydrogels. Specifically, for hydrogels with acidic groups such as the ones present in PAA/PVA, basic media cause the deprotonation of the gel. This increases the density of likewise charges and mobile counter ions in the hydrogel. The hydrogel in turn swells as a response (Eq. 1). Acidic media on the other hand, decreases both the density of charges and mobile counter ions by protonation of the gel and results in hydrogel shrinking (Eq. 2).

$$[RCOOH]_{hydrogel} + [OH^-]_{aq} \rightarrow [RCOO^-]_{hydrogel} + H_2O \qquad \text{Eq. 1}$$

$$[RCOO^-]_{hydrogel} + [H^+]_{aq} \rightarrow [RCOOH]_{hydrogel} \qquad \text{Eq. 2}$$

Use of pH-sensitive PAA/PVA hydrogel nanofibers for the sensing layer of LAPS may enhance LAPS sensor performance by causing the overall potential on the surface to change with pH changes thereby changing the photocurrent output. The potential change is a result of change in charge density as well as a change in the capacitance of the layer by swelling. Gel swelling changes the capacitance by effectively altering the width of the capacitor. The biocompatibility of the hydrogel in use is another advantage, making the sensor more suited for natural environments fabricating the hydrogel layer in the form of nanofibers adds the benefit of high surface area where the exchange of charges.

One method by which a LAPS sensor comprising a silicon chip onto which is printed a very thin layer of pH-sensitive hydrogel nanofibers is manufactured comprises electrospraying of a surface of the silicon chip with divinyl sulfone solution adjusted to pH 9, the electrospinning PAA/PVA hydrogel nanofibers onto the divinyl sulfone-coated silicon chip, followed by annealing in a vacuum oven to facilitate crosslinking of the nanofibers. The crosslinked hydrogel nanofibers are then crosslinked with a selected monosaccharide.

The first step is preparation of a hydrogel solution by dissolving 450,00 Da of PPV in 50 mL of MilliQ water after which, PVA is added to provide a PPA/PVA ratio of about 5:1 w/w. The PAA/PVA solution is stirred for a sufficient period of time to ensure a homogenous mixture.

Clean p-type Si substrates with a thickness of 525±25μ and having a natural $SiO_2$ layer may be used as the collecting target. A suitable collecting target is a p-type Si chip having the following properties: a resistance of 1-30 ohms; without a $SiO_2$ top coating; a thickness of 460μ to 530μ; polished on one side; and a roughness of 2 nm. A divinyl sulfone solution adjusted to pH 9, is then electrosprayed onto the Si chip (to ensure adhesion of the PAA/PVA nanofiber mat to the Si chip). The PAA/PVA solution is then immediately electrospun onto the divinyl sulfone-coated Si chip at a voltage value of about 20 kV with a flow rate of about 0.3 mL/h. The as-spun samples may be annealed under vacuum for 30 min at 145° C. to help the crosslinking and the evaporation of the residual solvents.

Eutectic GaIn may be used as the ohmic contact of the sensing chip. Following the annealing step, the sensing chips may be functionalized with a monosaccharide, for example d-mannose, by immersing in an aqueous solution containing 0.1 mol d-mannose and 1 ml divinyl sulfone as the cross linker. The solution pH is kept at 9 for activation of divinyl sulfone. The chips should be maintained in the solution for 12-18 h for complete functionalization of the PAA/PVA nanofibers with the monosaccharide. It is to be noted that functionalizing the sensing chip with d-mannose will detect *E. coli* coliforms by way of pH changes resulting as a consequence of *E. coli* metabolism of the d-mannose nutrient, whereby said pH changes produce a change in the photocurrent output when illuminated with a selected light source. It is within the scope of this disclosure to functionalize NF-LAPS sensing chips described herein with other nutrients selected for specific detection of *Salmonella* sp., *Listeria* sp., *Legionella* sp, and other microbial species.

It is to be noted that some features of the LAPS sensors configured as disclosed herein include a matted three-dimensional profile to the thin layer of pH-sensitive hydrogel nanofibers laid down onto the Si substrate wherein the three-dimensional profile in combination with a "ridge and valley" microscopic structure throughout, significantly increases the available LAPS sensor surface area available for functionalization with a selected monosaccharide. It is within the scope of the present disclosure, to functionalize the surface areas of the present LAPS sensors with a variety of substrates that are suitable for rapid microbial metabolism and degradation. For example, the NF-LAPS sensing chips described herein may be functionalized with substrates selected for detection of *Salmonella* sp., *Listeria* sp., *Legionella* sp., and other microbial species.

In some embodiments, the reader component of the systems disclosed herein may comprise a detector to detect changes in photocurrent intensity produced by illumination of the LAPS sensor in the cartridges of the present disclosure in reference to the photocurrent intensity detected from the reference SPE having a counter electrode and a reference electrode. When in use, a water sample containing bacteria may be contacted with a NF-LAPS Si chip functionalized as disclosed herein to detect the presence of bacteria to provide an estimate of the bacterial load in the water sample, thereby producing a used NF-LAPS Si chip. The bacteria in the water sample may metabolize selected nutrients added to the medium thereby causing pH changes in the electrochemical circuit in the used NF-LAPS Si chip. A low bacterial load in the water sample (i.e., small numbers of bacteria/mL) may cause a smaller pH change in the electrochemical circuit thereby resulting in a small change in the photocurrent output. A large bacterial load in the water sample (i.e., large numbers of bacteria/mL) a larger pH change in the electrochemical circuit thereby resulting in a larger change in the photocurrent output.

Upon illumination of the used NF-LAPS Si strip with a light source having a predetermined frequency and intensity, the pH changes in the electrochemical circuit will produce a detectable and measurable photocurrent. A small difference between the photocurrent intensity produced by used NF-LAPS Si chip by the LAPS sensor in reference to its SPE sensor may indicate the presence of a low number of bacteria/mL in the water sample. A large difference between the photocurrent intensity produced by used NF-LAPS Si chip by the LAPS sensor in reference to its SPE sensor may indicate the presence of a high number of bacteria/mL in the water sample. A lack of a difference between the photocurrent intensity produced by used NF-LAPS Si chip may indicate a lack of bacteria in the water sample.

The detector may detect a difference between the photocurrent generated by the LAPS sensor in reference to its SPE sensor, and then may display a visual signal in a visual display provided therefor on a surface of the reader component. The visual display may be an on/off illumination of a window or a bulb, or alternatively, a digital and/or an analog quantitative display NF-LAPS Si chip of the magnitude of the difference between the light signal intensity and/or the light spectrum/spectra produced by the LAPS sensor and the SPE sensor. According to an aspect, the detector may transmit the detected signals and signal differences by wireless communication to a receiver, for example, a portable personal electronic device such as a cell phone or an ipad or a tablet. Alternatively, the receiver may be a data logger configured for wireless communication with the reader component or alternatively, may be a database in a cloud computing system. Alternatively, the detector may be interconnected with a USB port situated on the outer surface the reader component, and may transmit the detected signals to a memory stick demountably engaged with the USB port.

In some embodiments, the receiver component may comprise a data storage component configured to receive and store therein discreet data sets from the detector wherein each discreet data set pertains to a single set of signals received from the SPE sensor and the LAPS sensor during a single illumination of a water-sample holding cartridge demountably engaged with the reader component. The data storage component may be configured to receive and store a plurality of data sets generated during selected periods of time, for example, sampling times and/or testing times. The data storage component may be configured to transmit one or more pluralities of data sets in response to wireless communications received from external electronic devices such as portable personal electronic devices, data loggers, cloud-based databases, and the like. Alternatively, the data storage may be interconnected with a USB port situated on the outer surface the reader component, and may be configured to controllably download selected pluralities of stored data sets to a memory stick demountably engaged with the USB port.

In some embodiments, such as the embodiment illustrated in FIG. 4, the reader component may be configured with two receptacles for demountably engaging therein two cartridges wherein a first cartridge may be functionalized to detect *E. coli* and a second cartridge is functionalized to detect other coliform bacteria, whereby a water sample may be concurrently tested for the presence of *E. coli* and coliform bacteria. Alternatively, the reader component may be configured with 3 or more receptacles for demountably engaging 3 or more cartridges therein and then, concurrently testing 3 or more water samples. For example, 4 or 5 or 6 or 7 or 8 or 9 or 10 or 15 or 20 or 25 or 30, and any number of receptacles therebetween. In some aspects, the reader component may comprise 10 receptacles.

In a further aspect, the reader component may be configured to test a single water sample concurrently for the presence of different bacteria across 2 or 3 or 4 or 6 or 7 or 8 or 9 or 10 receptacles. That is, water samples from the same source may be placed in a plurality of cartridges, each cartridge functionalized to detect a different contaminant, and subsequently concurrently tested using the reader component to determine if there are a plurality of different types of contaminants present in the water sample. In some aspects, the reader component may comprise one or more pairs of receptacles for receiving differently-functionalized cartridges (e.g. one functionalized for detecting *E. coli* and one functionalized for detecting other coliform bacteria) containing a water sample from the same source. In such aspects, the reader components may comprise 1 or 2 or 3 or 4 or 5 or more pairs of receptacles.

Although the foregoing disclosure has been described in some detail by way of illustration and example for purposes of clarity of understanding, it is readily apparent to those of ordinary skill in the art in light of the teachings of this disclosure that certain changes and modifications may be made thereto without departing from the spirit or scope of the appended claims.

It must be noted that as used in this specification and the appended claims, the singular forms "a", "an", and "the" include plural reference unless the context clearly dictates otherwise. Unless defined otherwise all technical terms used herein have the same meaning as commonly understood to one of ordinary skill in the art to which this disclosure belongs.

The phrase "and/or", as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to encompass the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

As used herein, whether in the specification or the appended claims, the transitional terms "comprising", "including", "having", "containing", "involving", and the like are to be understood as being inclusive or open-ended (i.e., to mean including but not limited to), and they do not exclude unrecited elements, materials or method steps. Only the transitional phrases "consisting of" and "consisting essentially of", respectively, are closed or semi-closed transitional phrases with respect to claims and exemplary embodiments herein. The transitional phrase "consisting of" excludes any element, step, or ingredient which is not specifically recited. The transitional phrase "consisting essentially of" limits the scope to the specified elements, materials or steps and to those that do not materially affect the basic characteristic(s) of the feature disclosed and/or claimed herein.

REFERENCES

1. Owicki et al., 1994, The light-addressable potentiometric sensor: principles and biological applications, Annu. Rev. Biophys. Biomol. Struct. 23:87-113.
2. Shaibani et al., 2016, The detection of *Escherichia coli* (*E. coli*) with the pH sensitive hydrogel nanofiber-light addressable potentiometric sensor (NF-LAPS). Sens. Actuators 226:176-183.
3. Shaibani et al., 2018, Portable nanofiber-light addressable potentiometric sensor for rapid *Escherichia coli* detection in orange juice. ACS Sens. 3:815-822.
4. Tu et al., 2000, The use of streptavidin coated magnetic beads for detecting pathogenic bacteria by light addressable potentiometric sensor (LAPS). J. Rapid Methods Autom. Microbiol. 8:95-109.
5. Yoshinobu et al., 2003, Portable light-addressable potentiometric sensor (LAPS) for multisensor applications, Sens. Actuators, 95:352-356.

The invention claimed is:

1. A system for rapid analysis of a fluid sample for detection of at least one viable microbial organism therein, the system comprising:
 a reader component comprising a housing containing therein:
  an illumination supply in communication with a port extending to a selected target site on an outer casing,
  circuitry for controlling the illumination supply,
  a potentiostat;
  circuitry interconnecting the potentiostat with one or more receptacles;
  a detector configured for detecting one or more differences in photocurrent outputs between a reference source and a sample source;
  wherein said reader component is configured for electronic communication with a microprocessor for modulation of the circuitry for controlling the illumination supply and for modulation of the potentiostat; and
 at least one cartridge comprising a casing with a tab extending outward from a side surface of the casing, the tab configured for demountable engagement with the one or more receptacles,
  a first well extending downward from an upper surface of the casing, said first well configured for receiving a fluid sample therein,
  a second well imbedded in the casing underneath a first portion of the first well, said second well having a screen printed electrode housing therein a counter electrode having a terminal end exposed at the tab and a reference electrode having a terminal end exposed at the tab;
  a third well imbedded in the casing underneath a second portion of the first well, said third well having a light-addressable potentiometric sensor with an upper surface having a layer of functionalized pH-sensitive hydrogel nanofibers thereon, said light-addressable potentiometric sensor having a working electrode having a terminal end exposed at the tab;
  wherein a bottom surface of the casing has a bore extending upward to about a bottom surface of the third well, said bore configured for communication with the port;
  and wherein the screen printed electrode is configured to communicate a reference signal to the detector and the light-addressable potentiometric sensor is configured to communicate a sample signal to the detector.

2. The system according to claim 1, wherein the housing is provided with a USB port interconnected with the circuitry for controlling the illumination supply and with the potentiostat.

3. The system according to claim 1, wherein the reader component is configured for wireless communication with a microprocessor, said microprocessor configurable for communication with and modulation of one or more of the circuitry for controlling the illumination supply, the potentiostat, and the detector.

4. The system according to claim 1, wherein the cartridge is a single-use disposable cartridge.

5. The system according to claim 1, wherein the one or more receptacles comprise 8 to 12 receptacles.

\* \* \* \* \*